United States Patent Office 2,907,991
Patented Oct. 6, 1959

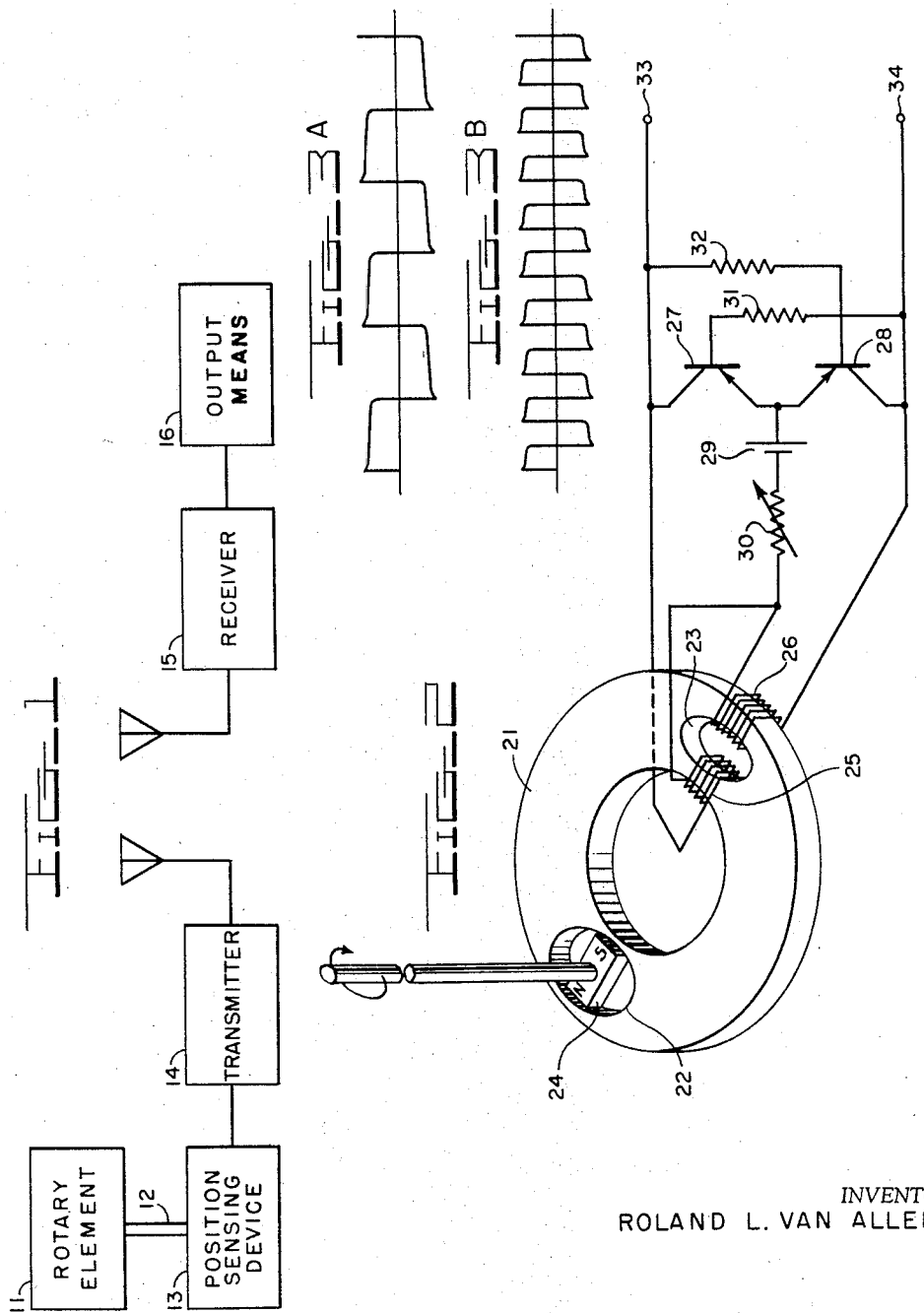

2,907,991
ROTARY SHAFT POSITION INDICATOR

Roland L. Van Allen, Butler, Pa.

Application July 23, 1958, Serial No. 750,544

4 Claims. (Cl. 340—207)

(Granted under Title 35, U.S. Code (1952), sec. 266)

The invention described herein may be manufactured and used by or for the Government of the United States of America for governmental purposes without the payment of any royalties thereon or therefor.

This invention relates in general to position sensing devices and in particular to electromechanical devices for determining the position of a rotatable shaft.

In numerous measuring and computing applications information is obtained or supplied in the form of variations in the position of a rotatable shaft with respect to a reference position. Frequently this information must be relayed from a remote station to a master control station. As a typical example, in radar and sonar applications azimuth and/or elevation information from a directional antenna must be relayed to the operator's station which may be located at a point some distance therefrom. In such an instance it is general practice to employ a remote transmission system of some kind. For example, a selsyn system wherein mechanical movement of the rotatable antenna elements is duplicated and observed at the operator's station might be employed.

Since a human operator is generally necessary, errors in judgment present an inherent problem in most prior art systems. It will be appreciated that a simple information relay system wherein the rotation information is converted into electrical information which might then be directly inserted in an electronic computer would be a most advantageous advancement of the art.

Accordingly:

It is an object of this invention to provide an electronic device for sensing the rotation of a rotatable shaft wherein the shaft rotation is represented as a frequency variation.

It is another object of this invention to provide a lightweight, low power device for sensing the rotation of a rotatable shaft.

It is still another object of this invention to provide an inexpensive and compact device for sensing the rotation of a rotatable shaft.

Other objects of this invention will become apparent upon a more comprehensive understanding of the invention for which reference is had to the following specification and the drawings wherein:

Fig. 1 is a block diagram of the device of this invention in an operating system;

Fig. 2 is a schematic diagram of one embodiment of the present invention;

Figs. 3a and 3b are graphical showings of several output waveforms for the embodiment of Fig. 2.

Briefly, the device of this invention employs an iron core of selected configuration and a magnetic multivibrator in connection therewith such that the flux condition in the iron core controls the frequency of the multivibrator output within a predetermined frequency range. In accordance with the invention, the flux condition in the core is variable in proportion to the angular displacement of the rotatable shaft. Thus the output frequency of the multivibrator is representative of the position of the rotatable shaft.

Referring now to the drawings:

Fig. 1 depicts a typical master-remote assembly which embodies the present invention. In this exemplary assembly, the remote station and the master station are widely separated one from the other and intercommunication is by means of radio wave transmission. In illustration the remote station might be located in an orbiting artificial earth satellite and the master station might be located at a selected point on the earth surface.

In the remote station a rotary element indicated in block diagram at 11, is connected via the rotatable shaft 12 to the position sensing device 13 to control a flux condition therein. It will be appreciated that the rotary element 11 is representative of any sensitive device which involves a rotatable shaft. For example, the rotary element 11 might be a D'Arsenal type meter wherein the indicator needle shaft is rotated.

The output of the position sensing device 13, which is more fully described in connection with Fig. 2, is connected to the remote station transmitter 14 to control the output thereof.

In the master station a receiver 15 is provided to receive the radio wave transmission from remote station transmitter 14 and a signal sensitive output means 16 is connected to the receiver 15 to utilize the output therefrom.

Fig. 2 depicts a preferred embodiment of the position sensing device 13 shown in Fig. 1. In this embodiment, a toroidal iron core 21 having two apertures indicated at 22 and 23 is shown with a rotatable bar magnet 24 disposed within the aperture 22 and a two state multivibrator coupled to the core via windings 25 and 26 which are wound through the aperture 23.

In general explanation of the two state multivibrator shown in Fig. 2, the device involves a first current conducting loop which includes the winding 25 and a second current conducting loop which includes the winding 26. These first and second conducting loops are alternately operative by means of the PNP type transistors 27 and 28, respectively, which perform a switching function in the device of this invention.

As is well known in the art, in the operation of a PNP type transistor as an on-off switching element, the collector and emitter impedance of the transistor is very high when both the collector and emitter voltages are equal to or more negative than the base voltage. As soon as the base becomes slightly negative with respect to the emitter, however, the emitter-collector impedance drops to the vicinity of one ohm.

Fig. 2 the emitter and base of the transistor 27 are connected, via voltage source 29 and resistance 30 in series, across the winding 26 and the emitter and base of the transistor 28 are connected, via voltage source 29 and resistance 30 in series, across the other winding 25. The collectors of the transistors 27 and 28 are connected, as shown, to the windings 25 and 26, respectively, to complete the circuits in the two conducting loops. Thus, in each state, the polarity and magnitude of the voltage across one winding controls the on-off switch in the conducting loop which includes the other winding. The windings are wound through the aperture indicated at 23 in opposite rotational sense to produce flux changes in opposite directions with respect to each other. It will be seen that the flux path for the field generated by current flow in the windings 25 and 26 is around the aperture indicated at 23.

In the embodiment of Fig. 2 the voltage source 29 produces current flow in either of the two conducting loops as determined by the switching transistors 27 and 28. It is understood, of course, that it is not essential to the device of this invention that a common voltage source be employed and that separate voltage sources for the two conducting loops may be substituted, if desired.

The resistance 30 also acts in either of the two conducting loops to limit the current flow therein. Likewise, it is not essential to this invention that a common current limiting impedance be employed and separate impedances for the two conducting loops may be substituted, if desired.

In simple operational analysis of the multivibrator shown in Fig. 2, at the beginning of one state the flux in the flux path around the aperture is in one of the two saturation conditions and the polarity of the winding 26 has reduced the collector to emitter impedance of transistor 27 which, in turn, effectively applies the voltage source 29, via the resistance 30, across the winding 25 to cause current flow therein. At the same time the polarity of the winding 25 maintains the transistor 28 in the nonconducting state to prevent current flow in the winding 26. The current flow in the winding 25 produces a flux level change in the opposite direction to that produced by the winding 26 in the previous state and the flux level in the flux path around the aperture begins to return to the other saturation condition. Once the other saturation condition is reached the polarity of the winding 25 reduces the collector to emitter impedance of transistor 28 which, in turn, effectively applies the voltage source 29, via the resistance 30, across the winding 26 to cause current flow therein. Meanwhile, of course, the transistor 27 switches to its non-conduction state to block current flow in the winding 25. Thereupon the process repetitiously continues.

It will be noted that while the bases and collectors of the two transistors are interconnected to facilitate the alternate switching action, they are not directly cross coupled in the embodiment of Fig. 2. The addition of the interconnecting resistive impedances 31 and 32 decreases the loading effect across the output terminals 33 and 34. Thus, while the impedances 31 and 32 are not essential and may be omitted, if desired, the result will be a lower output voltage.

The bar magnet 24 shown in Fig. 2 is disposed within the aperture 22 in a direction perpendicular to the flux lines in the flux path around the toroidal iron core 21. It will be seen that in the position shown, the bar magnet 24 has its least effect on the flux level in the iron core. The interconnecting shaft 35 which supports the bar magnet 24 is adapted to rotate in accordance with the rotatable member under observation, in this embodiment, the needle shaft 36. Thus as the needle shaft 36 rotates, the bar magnet 24 rotates to produce a proportionate increase in flux level in the iron core 21. Of course, it is not essential to this embodiment of the invention that the rotatable member 36 which is under observation and the bar magnet 24 be directly coupled, as shown, to rotate in exact synchronism. Any rotation rate ratio may be introduced by the insertion of a gearing arrangement, if desired. For optimum operation the strength of the field produced by the bar magnet 24 should be sufficient to saturate the iron core.

The waveform depicted in Fig. 3a is illustrative of the output of the multivibrator exemplarily shown in Fig. 2. This square waveform represents the output of the multivibrator for the zero input condition, that is, for the condition in which the rotatable shaft 24 is in the reference position as shown in Fig. 2. It will be appreciated that the period of each half cycle of the wave form shown is directly dependent upon the value of the current limiting impedance 30. Thus, the output frequency of the multivibrator for the reference condition can be controlled by varying the value of impedance 30. In the operation of the device of this invention, the prime function of the impedance 30 is to establish the reference frequency.

The waveform depicted in Fig. 3b is also illustrative of the output of the multivibrator shown in Fig. 2 but in another operational state. This square waveform represents the output of the multivibrator when the rotatable shaft is rotated from its reference position. It will be noted that the frequency of the waveform shown in Fig. 2b is greater than the frequency of the waveform shown in Fig. 2a. In accordance with the basic principle of this invention, the difference in frequency with respect to the reference frequency (Fig. 2a) is proportional to the rotation of the rotatable shaft from its reference position. It will be appreciated that the difference in frequency will increase as the bar magnet is gradually aligned with the flux lines in the toroid 21. In the direct coupling arrangement shown, the maximum difference in frequency would be representative of a quarter turn of the rotatable member 23 under observation.

Referring again to the embodiment of Fig. 2 and the operational assembly of Fig. 1. The output terminals 33 and 34 may be connected to the input of a transmitter to alter the transmitted output therefrom. Of course, it is not essential to this invention that a wave tranmission system separate the position sensing device from the utilization device. It is within the purview of this invention to connect any suitable frequency sensitive device across the output terminals 33 and 34.

In summary, it is understood, that this invention is not to be limited to the specific embodiments exemplarily shown herein and that many modifications of the embodiments shown are within the purview of this disclosure. For example, other magnetic multivibrators, the output frequency of which is dependent upon the portion of the hysteresis loop involved during each state, may be readily substituted for the magnetic multivibrator described in detail in this specification.

Likewise, an electromagnetic device may be readily substituted for the permanent magnet 24 within the aperture 22, to vary the flux condition in the iron core 21, if desired.

Finally, it is understood that this invention is only to be limited by the scope of the claims appended hereto.

What is claimed is:

1. A sensing device for determining the position of a rotatable shaft comprising a ferric core member having a toroidal ring configuration with first and second apertures in first and second sections of said ring, respectively; first and second windings wound on said core member through said first aperture, said first and second windings being wound in opposite rotational sense with respect to each other; electrical energy means; first and second on-off switching means; said first winding, said energy means and said first switching means being serially connected to form a first current conductive loop; said second winding, said energy means and said second switching means being connected to form a second current conductive loop; said first and second current conductive loops being operative to change the flux level in the flux path around said first aperture in opposite directions; means connecting said first switching means to said second winding and means connecting said second switching means to said first winding such that said first and second switching means are alternately conductive in accordance with the voltage across said second and first windings; respectively; frequency responsive output means operative in accordance with the frequency of operation of said first and second switching means; magnetic means disposed within said second aperture and adapted to rotate therein such that the flux level in the flux path around said ring varies in accordance with the rotation of said magnetic means, and means connecting said magnetic means to said rotatable shaft to roate in accordance with the rotary position thereof.

2. A sensing device for determining the position of a rotatable shaft comprising a ferric core member having a toroidal ring configuration with first and second apertures in first and second sections of said ring, respectively; first and second windings wound on said core member through said first aperture, said first and second windings being wound in opposite rotational sense with respect to each other; electrical energy means; first and second transistor type on-off switching means; said first winding, said energy means and said first switching means being serially connected to form a first current conductive loop; said second winding, said energy means and said second switching means being connected to form a second current conductive loop; said first and second current conductive loops being operative to change the flux level in the flux path around said first aperture in opposite directions; means connecting said first switching means to said second winding and means connecting said second switching means to said first winding such that said first and second switching means are alternately conductive in accordance with the voltage across said second and first windings; respectively; frequency responsive output means operative in accordance with the frequency of operation of said first and second switching means; magnetic means disposed within said second aperture and adapted to rotate therein such that the flux level in the flux path around said ring varies in accordance with the rotation of said magnetic means, and means connecting said magnetic means to said rotatable shaft to rotate in accordance with the rotary position thereof.

3. A sensing device for determining the position of a rotatable shaft comprising a ferric core member having a toroidal ring configuration with first and second apertures in first and second sections of said ring, respectively; first and second windings wound on said core member through said first aperture, said first and second windings being wound in opposite rotational sense with respect to each other; electrical energy means; first and second on-off switching means; said first winding, said energy means and said first switching means being serially connected to form a first current conductive loop; said second winding, said energy means and said second switching means being connected to form a second current conductive loop; said first and second current conductive loops being operative to change the flux level in the flux path around said first aperture in opposite directions; means connecting said first switching means to said second winding and means connecting said second switching means to said first winding such that said first and second switching means are alternately conductive in accordance with the voltage across said second and first windings; respectively; frequency responsive output means operative in accordance with the frequency of operation of said first and second switching means; means for producing a magnetic field disposed within said second aperture and adapted to rotate therein such that the flux level in the flux path around said ring varies in accordance with the rotation of said means for producing a magnetic field and means connecting said means for producing a magnetic field to said rotatable shaft to rotate in accordance with the rotary position thereof.

4. A sensing device for determining the position of a rotatable shaft comprising a ferric core member having a toroidal ring configuration with first and second apertures in first and second sections of said ring, respectively; first and second windings wound on said core member through said first aperture, said first and second windings being wound in opposite rotational sense with respect to each other; electrical energy means; first and second transistor type on-off switching means, said first winding, said energy means and said first switching means being serially connected to form a first current conductive loop; said second winding said energy means and said second switching means being connected to form a second current conductive loop; said first and second current conductive loops being operative to change the flux level in the flux path around said first aperture in opposite directions; means connecting said first switching means to said second winding and means connecting said second switching means to said first winding such that said first and second switching means are alternately conductive in accordance with the voltage across said second and first windings; respectively; frequency responsive output means operative in accordance with the frequency of operation of said first and second switching means; means for producing a magnetic field disposed within said second aperture and adapted to rotate therein such that the flux level in the flux path around said ring varies in accordance with the rotation of said means for producing a magnetic field, and means connecting said means for producing a magnetic field to said rotatable shaft to rotate in accordance with the rotary position thereof.

No references cited.